United States Patent [19]

Beitel et al.

[11] Patent Number: 4,937,760

[45] Date of Patent: Jun. 26, 1990

[54] METHOD FOR SHARING COMMON VALUES IMPLICITLY AMONG COMMUNICATING GENERATIVE OBJECTS

[75] Inventors: Bradley J. Beitel, Woodside; Robert D. Gordon, Sunnyvale; Ming C. Hao, Los Altos Hills; Steven V. Kauffman, San Jose; Ronald L. Obermarck, Redwood City; Arthur M. Sherman, Morgan Hill; Lynne C. Thieme, Menlo Park; Gene E. Trivett; Lynn Trivett, both of Portola Valley, all of Calif.

[73] Assignee: International Business Machines Corporation, Armonk, N.Y.

[21] Appl. No.: 246,472

[22] Filed: Sep. 19, 1988

[51] Int. Cl.⁵ .............................................. G06F 15/18
[52] U.S. Cl. .................................... 364/513; 364/200; 364/274.5; 364/300; 364/900; 364/972.3
[58] Field of Search ............... 364/513, 200, 300, 900; 382/14, 15

[56] References Cited

U.S. PATENT DOCUMENTS

| | | | |
|---|---|---|---|
| 4,410,940 | 10/1983 | Carlson et al. | 364/200 |
| 4,628,435 | 12/1986 | Tashiro et al. | 364/300 X |
| 4,631,673 | 12/1986 | Haas et al. | 364/300 |
| 4,736,321 | 4/1988 | Brown et al. | 364/300 |
| 4,813,013 | 3/1989 | Dunn | 364/900 |
| 4,849,905 | 7/1989 | Lieb et al. | 364/513 |

*Primary Examiner*—Joseph Ruggiero
*Attorney, Agent, or Firm*—R. Bruce Brodie

[57] ABSTRACT

A method for synchronizing common values in a distributed system, at least one node of which is a cyclic, rule-based, object-sensitive production system. Values altered in one part of the system are implicity rather than explicitly communicated and processed to and from the rule-based node. All communications to the rule-based node of common values changed by the nonrule-based nodes are by way of a list independent of and concurrently with any procedural request of the rule-based node, there being no necessary relation between the list contents and the procedural request.

12 Claims, 2 Drawing Sheets

METHOD FOR SHARING COMMON VALUES IMPLICITLY AMONG COMMUNICATING GENERATIVE OBJECTS

FIELD OF THE INVENTION

This invention relates to a computer method for sharing common values implicitly among communicating generative objects, and more particularly, among those objects residing in the same or distinguishable knowledge processing environments (KPEs) and among generative objects communicating between KPEs and data processing environments (DPEs).

A generative object refers to any dual-purpose information entity. On one hand, the entity can be processed as data. On the other hand, the entity can be executed as a process generating an information stream. Examples include knowledge base domains and APL functions. Communicating generative objects are those objects exchanging information streams.

DESCRIPTION OF RELATED ART

It is well known that one or more applications may run on the same partition or on different logical partitions of the same processor. Also, applications may execute and reside on different physical processors such as a host CPU and a remote attached programmable workstation (PWS).

Applications may both call and yet be transparent to concurrent cooperating processes operable at a subordinate level. Examples of such processes are coroutines and APL shared variables managing interfaces. Such cooperating processes may likewise be found on the same or different partitions or physical processors.

The following paragraphs set out a description of a KPE, a discussion of the APL shared variable interface and coroutines, and updating of versions of the same information in a distributed relational data base.

The Knowledge Processing Environment

A KPE or production system comprises a rule set, a rule interpreter (inference engine) that decides when and how to apply such rules, and a memory that can hold data, goals, and intermediate results. The rules encode associations between patterns of data presented to the system and actions the system should perform as a consequence. Each rule is expressed as a conditional statement of the form:

IF <pattern match exists>
  THEN <draw inference or take action>.

Such systems are of either the forward- or backward-chaining types. In forward-chained systems, each processing cycle includes executing one rule selected from a subset of rules whose patterns match the changes in data, changing the state of the data, and repeating the cycle.

APL Shared Variables Used for Synchronizing Generative Objects Over a Demand/Response Interface Brown et al., U.S. Pat. No. 4,736,321, "Communication Method Between an Interactive Language Processor Workspace and External Processes", issued Apr. 5, 1988, disclose the use of shared variables to synchronize a generative object (APL-defined functions) arising out of an interpretive language context (APL workspace) with an excutable (FORTRAN) object external to the APL workspace. Significantly, the method requires that the APL-defined functions using shared variables reference the external processes or data explicitly and be synchronized and locked until the process is completed or data referenced.

Brown's method steps comprise:

(a) establishing a message interface between the source and external processes, including designating and locally recording argument data types expected by the external process;

(b) converting arguments to the data types expected by the external process and calls by value from the source process into calls by pointer type, and passing the converted calls via the interface to the external process; and (c) responsive to the completion of external processing, converting operands into data types acceptable to APL.

Coroutines as an Example of Cooperative Sequential Processing

Carlson et al., U.S. Pat. No. 4,410,940, "Transfer of Control Method and Means Among Hierarchical Cooperating Sequential Processes", issued Oct. 18, 1983, exemplify coroutining among concurrent processes in which the pairwise selection among the processes is constrained by hierarchical relations among the processes.

As may be recalled, in a subroutine program structure, there exists an asymmetric master/slave relationship between a calling process and its subroutine. In contrast, coroutines are processes that may call each other but do not have this master/slave organization. That is, the relationship between coroutines is symmetric. Each coroutine is both master and slave. On exit from a coroutine, its state is saved. The next time the coroutine is called, it resumes at exactly the point where it left previously with all of its internal variables unchanged. This means that the previous state of the coroutine is restored.

Data Base Updating—Same View of Common Values

Haas et al., U.S. Pat. No. 4,631,673 "Method for Refreshing Multicolumn Tables in a Relational Data Base Using Minimal Information", issued Dec. 23, 1986, teach the asynchronous updating of remote versions of common objects having the same view in a distributed network of relational data bases using minimal information. The term "same view" means that the specification defining the information set of interest is the same.

SUMMARY OF THE INVENTION

It is an objective of this invention to devise a method for sharing common values implicitly among communicating generative objects. It is a related objective that the communication occur either among KPE objects or between at least one KPE object and one DPE object.

The foregoing objectives are satisfied by a method for synchronizing common values in a distributed system, at least one node of which is rule-based. Values altered in one node of the system are implicitly rather than explicitly communicated and processed to and from the rule-based node. This is assured by communicating all changes (creation, modification, or deletion) to common values made by one node to be in the form of a list prefixed to any procedural request. The contents of the list include only those changes made since the last list was sent. Significantly, the list contents are not necessarily correlated with the appended request. The node receiving the list updates its common values prior to processing any request.

In a first embodiment, the objects respectively are accessible only across counterpart logically partitioned and isolated demand/response interfaces. At least one of the partitions includes a rule-based system otherwise termed a knowledge processing environment (KPE). This embodiment utilizes five steps.

First, a process is created in each partition cooperative with counterpart concurrent processes in other partitions. Second, selective processes in the partitions create, modify, or delete common values, and form a list of changes. Third, processes in other than the KPE partition communicate any change list to the KPE partition independent from and concurrently with any procedural request to the KPE partition. Fourth, the KPE partition updates its common values according to the change list. Fifth, any change list originating at the KPE partition is converted and communicated into a format acceptable by the non-KPE partition, and upon receipt is used to update the local version of the common values.

Significantly, the object in the KPE partition includes a frame. Each frame has a frame name, slot, facet, and value portions thereof. Furthermore, the production system in the KPE partition further includes a frame manager for creating and manipulating frames among objects. Also, the common values are included in only those frames which constitute a common subset of all of the frames. Relatedly, the common values in non-KPE partitions are formatted as records.

In another embodiment of the method, both objects reside in a cyclic, rule-based, object-sensitive production system.

As a concrete instance, suppose a nuclear reactor simulation was being executed in the DPE at a remote programmable workstation. Such a simulation would be replete with gauge and control indications. Suppose that the values of the gauges and controls would be obtained from an information set common to both the KPE and DPE.

The simulation at the DPE might operate upon gauge and control data and selectively alter some of the data. Assume an explanation would be desired as to the present or prospective simulation response resulting from the changed gauge and control data. One solution would be for the DPE to send the updated values to the host-based KPE independent of the request for an explanation.

DESCRIPTION OF THE PREFERRED EMBODIMENT

Processing in a KPE Environment

A description of a cyclic, forward-chained, rule-based, data object-sensitive production system is set out in Loeb et al., copending U.S. application Ser. No. 07/114,485, filed Oct. 28, 1987, U.S. Pat. No. 4,849,905. Said application is incorporated herein by reference. The object-sensitive, rule-based system described in the copending application includes means for storing data objects and rules, and means cooperating with the storage means for executing a control cycle. Each rule has pattern indication and action specifying parts.

A typical control cycle of such a rule-based system comprises the cyclic steps of (i) identifying an executable subset of rules by matching the pattern parts of the rules to those data objects in the storage means modified or created during a preceding cycle, (ii) selecting a rule from the identified rules, and (iii) executing the action prescribed by the selected rule.

Rule-based systems of this type preferably utilize frames for describing objects and main memory networks, and a frame manager for executing functions over the frames and as a responsive interface. That is, the frame manager provides a set of functions for creating and manipulating frames in the main storage of a CPU. In this regard, frames are used for both knowledge representation and object programming.

Frames Overview

Frames are structured object descriptions which group facts according to argument values. Frames are similar to semantic networks in that they are responsive to two argument predicates. Since a frame is a construct in its own right, there arises the need for descriptive completeness. In this regard, a frame partakes of entity, attribute, and value characterization and organization of information although using a distinctive nomenclature (frame, slots, facets, and values). One important consequence is that rules can be squirreled into a slot or facet and be galvanized into action when the frame pigeonhole becomes accessed.

Inheritance Overview

Formally, inheritance is a frame-based function always involving two predicates. These include a property predicate and a relationship predicate. Thus, a property predicate p(X,Value) "inherits" with respect to relationship predicate r(X,Y) if it can be shown that the rule "r(X Y) and p(Y,Value)→p(X,Value)" holds.

Informally, consider the following as illustrative of inheritance. An enterprise employing many persons would have to replicate many times its business address in a knowledge base having a parent frame for the business and a subordinate frame for each employee. Instead, a single address fact is stored and a type of reasoning or computation is applied to that fact in order to relate it to each employee frame. The reasoning is termed "inheritance". That is, the address fact inherits from the parent to the employee frames.

Hosts and Remote Intelligent Workstations

Figure 3:
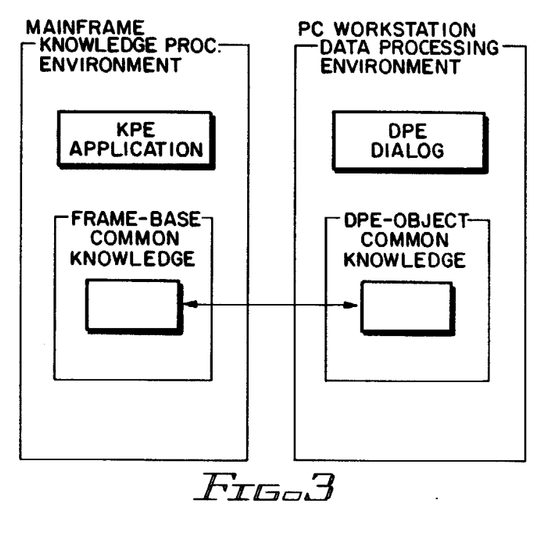
FIG. 3 shows a relationship between a KPE object and a DPE object according to the invention.

Referring now to FIG. 3, there is shown diagrammatically a host CPU, preferably of the IBM System/370 type, and a compatible communicating workstation such as an IBM PC using a 3270 emulation facility or the like. In this embodiment, the host includes an operating system such as MVS, and a high-level procedural language facility such as PL/I extended with rule-based production system functions for running applications. The workstation should be capable of supporting any compatible procedural language application such as a simulation or the like.

KnowledgeTool ™

The high-level procedural language facility of choice at the host is KnowledgeTool ™. This was first made available by IBM in December 1987. It is described in IBM publications such as "IBM KnowledgeTool Users Guide and Reference", SH20-9251-0, copywrite by IBM October 1987. This facility includes a PL/I compiler, rule-based language extensions, and constructs based on the Carnegie-Mellon OPS5 forward-chained language system, and other constructs such as frames and frame management.

The KnowledgeTool system utilizes a method for compiling a data-driven, forward-chaining production system from a source code sequence combinatorially selected from a set consisting of block-structured language instructions (PL/I) and a rule-based extension of primitives (RESP). The extension primitives include such invocable constructs as a data base, a set of rules, and an inference engine.

The data base (working memory) includes data structures representative of the domain of the production system. The set of rules (production memory) is representative of domain knowledge of the production system. Lastly, the inference engine executes each rule selected from the set of rules whose patterns match the change in the data base occurring in a prior recurrent match, selection, execution cycle.

Creation of a host executable application involves (a) forming and recording a sequence of instructions including said primitives; (b) converting the sequence into source code of the block-structured language and a description of production memory; (c) forming a runtime executable production system including a comparison (RETE) network from the source code and the description; and (d) debugging said production system by selectively executing portions thereof and altering the source code at a demand/responsive, man/machine interface, and compiling out an object code version of the procedural language sequences and link editing them to the appropriate production system invocations.

Frames and Inheritance in KnowledgeTool

Figure 1:
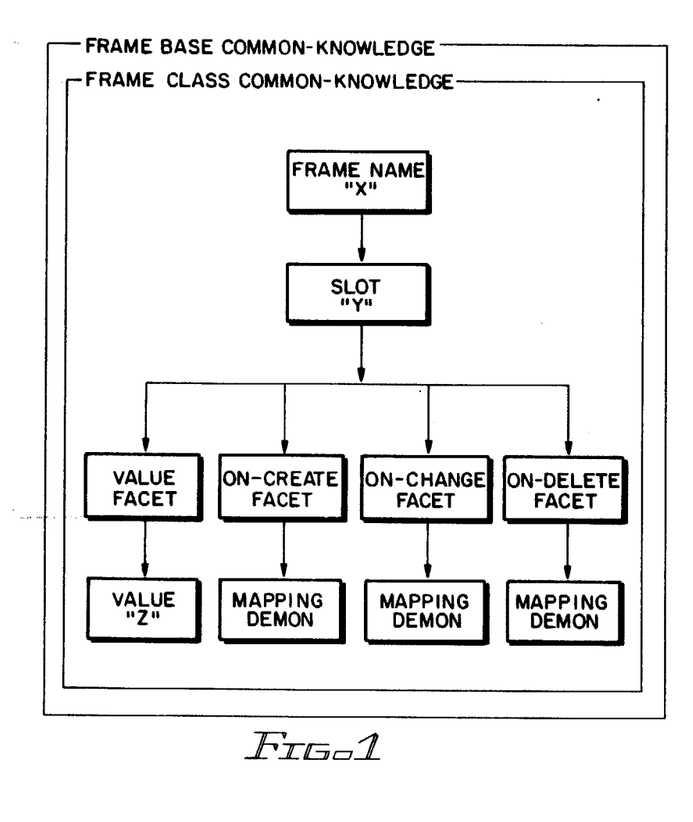
FIG. 1 depicts a frame representation of an object suitable for processing in a KPE environment, while FIG. 2 connotes a record representation suitable for processing in a DPE environment.

Referring now to FIG. 1, there is shown a frame representation of an object suitable for processing in a KPE environment. Four frame structural levels are depicted. These include:

| FRAME | The frame NAME provides the initial access path to the information stored within the frame. |
|---|---|
| SLOTS | Describe important fields or relational descriptors associated with the frame and its values. |
| FACETS | Denote information used to modify or augment the values of a slot. |
| VALUES | The data or facts associated with a SLOT/FACET pair. |

Frame classes are used to specify storage management policies and other information about a collection of frames. Frame classes provide a collection of demons for faster inheritance searches, storage management methods, and a repository for information to be shared by a set of member frames.

The frame functions include so-called basic frame functions (F-functions) and inheritance functions (H-functions). H-functions activate demons under specific conditions based upon the existence of reserved facet names. The F-functions operate on parts of a single frame and are used internally. In contrast, the H-functions are a superset of the F-functions. The H-functions cover the F-functions plus activate the inheritance of values and demons.

As previously mentioned, there exists a class or parent frame which is used to provide class information for a set of frames. Correlatively, there exists a counterpart set of class frame functions which takes a class frame as an argument.

The following are examples of F-functions, H-functions, and class frame functions:

| Function | Operation |
|---|---|
| FGET | Returns a list of frame parts such as slots, facets, or values. |
| FPUT | Adds a new frame part such as slots, facets, or values. |
| FCHG | Replaces a frame's values. |
| FDEL | Deletes part or all of a frame. |
| FINVOKE | Directly calls a list of demons. |
| HGET | Returns a list of frame parts such as slots, facets, or values. |
| HPUT | Adds a new frame part such as slots, facets, or values. |
| HCHG | Replaces a frame's values. |
| HDEL | Deletes part or all of a frame. |
| HINVOKE | Directly calls a list of demons. |
| OPEN_CLASS | Opens a frame class allowing frame functions to be executed on instances of the class. |
| CLOSE_CLASS | Closes a class which prevents frame functions from executing on instances of the class. |

Inheritance, as it is implemented in KnowledgeTool, connotes obtaining values or activating demons in the parent frame. A "parent frame" is any frame that is coupled to a current frame by way of an inheritance slot using the value facet. Note that identity of slots reserved for inheritance must be given to the frame manager.

An illustrative Use

A typical application utilizing objects having common values involves diagnostics for auto engines. The host-based KPE would include knowledge concerning auto engines and both etiology and symptomology of faulty engine performance. The KPE knowledge base would further include menues and data, and graphic representations of engine components. The objects expressing common values would include symptoms, engine components, menu and graphics screen identifiers.

Initially, a mechanic utilizing a remote terminal-based DPE utilizing an initial menu would input facts relating to engine type and symptoms. These record-oriented facts would be processed by the DPE, locally stored as an object expressing common values, and then be transmitted to the host-based KPE. At the KPE, the record-oriented facts would be remapped into frame-oriented objects expressing common values and stored as part of the frame-organized knowledge base.

The KPE objects would then invoke rules by operation of the changed data state in the forward-chained, rule-based system. The consequences of the rule invocation would yield either a problem diagnosis or a request for more information. In the event that a problem was diagnosed, then an object expressing common values would be sent to the remote terminal-based DPE. This object would identify, for example, a graphics screen displaying the auto engine part presumptively faulty. In the event that more specific information was requested, then another object expressing common values would be sent to the DPE terminal identifying a menu displaying questions to be answered by way of the mechanic's input. The host-based KPE would reformat the objects to be sent from a frame to a record orientation.

A Protocol Supporting the Illustrative Use

Figure 2:
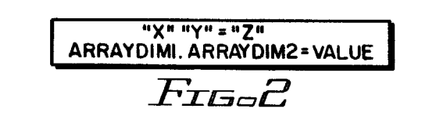

| Step | Action |
| --- | --- |
| (1) | The end user at the PWS DPE terminal selects the DIALOG function from among the menu functions. |
| (2) | Responsive to the selection, the DPE opens or reopens a record-oriented object data file and records the selection and pertinent data. (Recall from FIG. 2 that the record-oriented data is of the form <array dim1> <array dim2> <value>. Also note that the DPE places a U token in front of each record indicating that the record string is an update to the common values.) |
| (3) | The DPE invokes a first macro (HOSTSEND) for the purpose of sending data to the host-based KPE. |
| (4) | Any object expressing common values changed since the last HOSTSEND was issued by the DPE is collected, buffered, and transmitted to the KPE. |
| (5) | At the KPE, a record-to-frame conversion procedure (EWCECKF0) is invoked which maps <array dim1> into a frame name, <array dim2> into a slot, and <value> into the VALUE facet. |
| (6) | At the KPE, switch to the frame base of objects expressing common values. |
| (7) | Responsive to the U token, the conversion procedure causes the frame base function FCHG to be executed. If FCHG can find a match between the frame array coordinates of the new updates and the frame, then the updates overwrite the counterpart frame contents. However, in the absence of a match, a correponding FPUT function is invoked in order to create a new value. The F-functions are used to avoid inheritance of the mapping demons occasioned if the H-functions were used. |
| (8) | The conversion procedure terminates and the changes to the frame trigger the invocation of rules in the KPE application. |
| (9) | In the event that the KPE rule processing results in updates to objects expressing common values, requires first switching to the requisite frame base, and second making an H call to invoke a demon inheritance indicating the frame name of the object. |
| (10) | Since updates are involved, an HCHG function is called causing the frame manager to invoke the change demon (EWCECKC0). This demon, in turn, issues an FCHG to update the frame and then passes control to a frame to record the conversion procedure (EWCECKA0). |
| (11) | The frame-to-record conversion procedure maps the frame name and slot into <array dim1> and <array dim2> respectively, removes the facet, and puts the VALUE in the <value> field. A U token indicative of an update is placed in front of the string. Lastly, the entire string is buffered. |

-continued

| Step | Action |
| --- | --- |
| (12) | Control is returned to the KPE application and processing continues. |
| (13) | A second macro (PWSEND) is issued at the KPE to pass control back to the remote terminal-based DPE. |
| (14) | The buffered string is passed from KPE to DPE. At the remote terminal, the updates to objects expressing common values are stored in a local data file. The objects can indicate, for example, certain screens for DPE display. |

Figure 4:
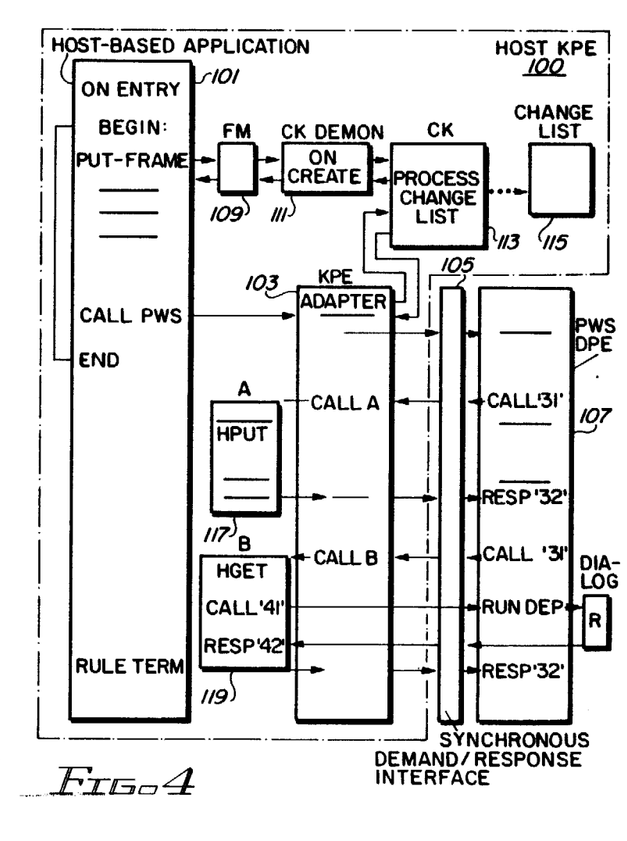
FIG. 4 shows a KPE control path emphasizing the creation of a new common value in a frame-based object.

Referring now to FIG. 4, there is shown a data and control flow interaction between the host-based KPE 100 and the remote programmable PWS-based DPE 100 coupled over a synchronous demand/response interface 105. The interface may be of the IBM 3270 type. Such an interface would be resident on PWS 107 in the form of an IBM 3278/78 emulation of the 3270 interface. Host 100 is coupled to said interface by way of an adapter 103. A host-based application is figuratively shown in block 101. An application preferably should be written in an extended high-level, block-structured language such as KnowledgeTool. As previously discussed, KnowledgeTool is the PL/I language system extended to include rule-based inferencing and data structures such as forward-inferencing rules and frame-organized objects.

The application would consist of sequences of PL/I statements interspersed by sequences invoking the knowledge processing environment functions. The application 101 is bounded with such conventional reserved word artifacts as BEGIN and END.

As soon as a list of changed common values 115 is received by host 100, it is immediately converted by procedure EWCECKF0 which maps the record-oriented information into frame name, slot, and value information. After the conversion and in response to a U token, the frame base function FCHG is executed. In the event that FCHG cannot find a match between a slot and a changed slot and value and a counterpart in the KPE frame object, then it is necessary to create a new slot and value facet. This comparison processing is represented by block 113. A counterpart FPUT function is invoked under the CREATE demon block 111.

Figure 5:
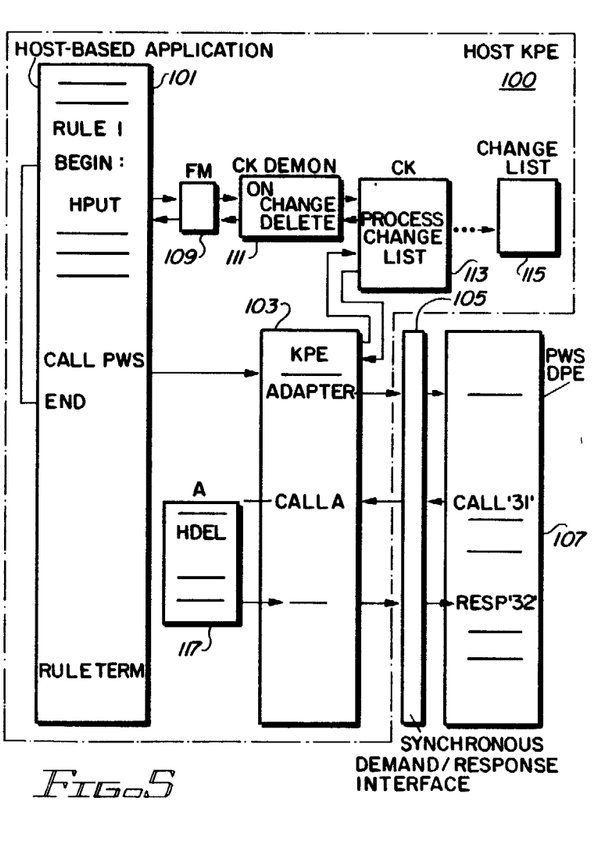
FIG. 5 shows a KPE control path emphasizing the change or deletion of common values in a frame-based object.

Referring now to FIG. 5, if there exists a match between the frame array coordinates of the new updates and the frame, then the updates overwrite the counterpart frame contents as represented by the CHANGE and DELETE demon block 111. The CHANGE demon is represented by the sequence EWCECKC0, and the DELETE demon is represented by the sequence EWCECKD0.

Referring again to FIG. 4, in the event that the KPE rule processing results in updates that change or alter common values, an H call is invoked such as HPUT 117 or HDEL 117. These alter the KPE frame object by way of procedure EWCECKR0 or EWCECKD0, respectively, and then in turn issues either an FPUT or an FDEL and control is passed as represented by process change list 113 to the frame-to-record conversion procedure EWCECKA0. The record-oriented changes are represented by change list 115. A U token indicative of an update is placed in front of the string, and the entire string is buffered. Control is passed to the application and processing continues. Subsequently, the buffered changes are prefixed to a request from the KPE to the DPE, the buffered string contents being not necessarily correlated with the request. At this point, control passes from the KPE to the DPE.

Subordinate Functions and Tables

The following functions implement selective aspects of the method of this invention. These functions are implemented in the C language system. A brief description and recitation is set out for the CREATE, CHANGE, and DELETE demons and for format and string conversion.

The CREATE Demon

EWCECKR0 is an On-Create demon invoked by the HPUT function of the frame manager for the class of frames in COMMON KNOWLEDGE and in the frame base COMMON KNOWLEDGE. EWCECKR0 passes control to EWCECKA0 to translate the frame calls into AVA character strings.

```
/****************************************************/
/* Create value of common knowledge                 */
/****************************************************/

FPUT(inp1->frame,
     inp1->slot,
     inp1->facet,
     inp1->value,
     inp1->class);

/****************************************************/
/* Indicate to EWCECKA0 that this is a type update  */
/* call                                             */
/****************************************************/ call_type[0] = PWSCHG;

/****************************************************/
/* Call EWCECKA0 to convert the frame call to AVA   */
/* strings and store in a buffer in the PWS         */
/* communication block                              */
/****************************************************/ inp2 = (char *) PWSptr;
EWCECKA0_token = GET_TOKEN("EWCECKA0");
```

Frame to PWS Character String Conversion

EWCECKA0 is a procedure to convert frame manager calls to an AVC character stream. EWCECKA0 is invoked by the demons EWCECKC0, EWCECKR0, and EWCECKD0 when a change is made to any frame stored in the class and frame base of common knowledge.

```
/****************************************************/
/* EWCECKA0 - procedure to convert frame calls to an */
/*            PWS character stream                   */
/****************************************************/

/****************************************************/
/* If the length of the call is less than the       */
/* overall buffer maximum, but cannot fit into the  */
/* buffer segment currently addressed, another      */
/* segment is allocated and chained                 */
/****************************************************/ call_len = strlen(PSWptr->PWSFRAME) +
           strlen(PWSptr->PWSSLOT)  +
           strlen(PWSptr->PWSVALUE) + 4;

if (call_len < PWSCKBMX)
{
   temp = call_len + PWSptr->PWSCKLST->PWSCKOLN;
```

```
if (temp > PWSCKBMX)
{
  PWSptr->PWSCKLST->PWSCKPTN = malloc(sizeof(PWSCKOUT));

PWSptr->PWSCKLST = PWSptr->PWSCKLST->PWSCKPTN;
}

/**********************************************************/
/* Add a 'U' to the buffer if an HCHG or HPUT call         */
/* has occurred, or add a 'D' if an HDEL call has          */
/* occurred                                                */
/**********************************************************/ if (call_type[0] = PWSCHG)
   PWSptr->PWSCKLST->PWSCKBUF [PWSptr->PWSCKLST->
                              PWSCKOLN++] = PWSCHG;
   else
      PWSptr->PWSCKLST->PWSCKBUF [PWSptr->PWSCKLST->
                              PWSCKOLN++] = PWSDEL;

/**********************************************************/
/* Add frame name to the buffer                            */
/**********************************************************/ index = 0;
do
   PWSptr->PWSCKLST->PWSCKBUF [PWSptr->PWSCKLST->PWSCKOLN++]
                            = PWSptr->PWSFRAME [index];
while (PWSptr->PWSFRAME[++index] != NULL);

/**********************************************************/
/* Add a period followed by the slot to the buffer         */
/* if the slot is not null                                 */
/**********************************************************/ if (PWSptr->PWSSLOT != NULL)
{
   PWSptr->PWSCKLST->PWSCKBUF [PWSptr->PWSCKLST->PWSCKOLN++]
                                             = PWSPERD;
   index = 0;
   do
      PWSptr->PWSCKLST->PWSCKBUF [PWSptr->PWSCKLST->
                              PWSCKOLN++] = PWSptr->
                              PWSSLOT [index];
   while (PWSptr->PWSSLOT[++index] != NULL);
}
/**********************************************************/
/* Add a null followed by the value to the buffer if       */
/* the value is not null                                   */
/**********************************************************/

PWSptr->PWSCKLST->PWSCKBUF [PWSptr->PWSCKLST->PWSCKOLN++]
                                          = PWSNMTRM;

for (index=0; PWSptr->PWSVALUE[index] != NULL; index++)
{
```

```
                PWSptr→PWSCKLST→PWSCKBUF [PWSptr→PWSCKLST→PWSCKOLN++]
                                       = PWSptr→PWSVALUE [index];
}

/*******************************************************/
/* Add final null character to the buffer              */
/*******************************************************/

PWSptr→PWSCKLST→PWSCKBUF [PWSptr→PWSCKLST→PWSCKOLN++]
                                        = PWSDATRM;

*return_code = 0;
}

/*******************************************************/
/* If the buffer of the frame call to be added to      */
/* the buffer is the maximum buffer of the buffer,     */
/* an error is returned                                */
/*******************************************************/ else
   *return_code = PWSCKNOS;
```

The CHANGE Demon

EWCECKC0 is an On-Change demon invoked by the HCHG function of the frame manager for the class of frames in COMMON KNOWLEDGE and in the frame base COMMON KNOWLEDGE. EWCECKC0 passes control to EWCECKA0 to translate the frame calls into AVA character strings.

```
/*******************************************************/
/* Change value of common knowledge                    */
/*******************************************************/

FCHG(inp1→frame,
     inp1→slot,
     inp1→facet,
     inp1→value,
     inp1→class);
/*******************************************************/
/* Indicate to EWCECKA0 that this is a type update     */
/* call                                                */
/*******************************************************/ call_type[0] = PWSCHG;

/*******************************************************/
/* Call EWCECKA0 to convert the frame call to AVA      */
/* strings and store in a buffer in the PWS            */
/* communication block                                 */
/*******************************************************/ inp2 = (char *) PWSptr;
EWCECKA0_token = GET_TOKEN("EWCECKA0");
```

The DELETE Demon

EWCECKD0 is an On-Delete demon invoked by the HDEL function of the frame manager for the class of frames in COMMON KNOWLEDGE and in the frame base COMMON KNOWLEDGE. EWCECKD0 passes control to EWCECKA0 to translate the frame calls into AVA character strings.

```
/****************************************************/
/* Delete value of common knowledge                 */
/****************************************************/

FDEL(inp1->frame,
     inp1->slot,
     inp1->facet,
     inp1->value,
     inp1->class);

/****************************************************/
/* Indicate to EWCECKA0 that this is a type delete  */
/* call                                             */
/****************************************************/ call_type[0] = PWSDEL;

/****************************************************/
/* Call EWCECKA0 to convert the frame call to AVA   */
/* strings and store in a buffer in the PWS         */
/* communication block                              */
/****************************************************/ inp2 = (char *) PWSptr;

EWCECKA0_token = GET_TOKEN("EWCECKA0");
```

PWS Character-to-Frame Conversion

EWCECKF0 is a procedure to convert AVC command strings to frame calls. EWCECKF0 is called by EWCEESA0.

```
/****************************************************/
/* EWCECKF0 - Common Knowledge PWS stream-to-frame  */
/*            conversion                            */
/****************************************************/

/****************************************************/
/* Loop through the buffer passed, pulling out each */
/* PWS command string from the stream and converting*/
/* it to a frame call                               */
/*                                                  */
/* The PWS command string is assumed to be in the   */
/* following format:  "Uframe.slot\0value\0"        */
/*                                                  */
/* frame base = COMMON KNOWLEDGE,                   */
/* class = COMMON KNOWLEDGE, and                    */
/* facet = value are assumed                        */
/*                                                  */
/* When an error occurs, the place in the stream    */
/* where the error has occurred is stored at        */
/* PWSCKERP and control is returned.                */
/****************************************************/ while (PWSptr->PWSCKILN > 0)
{ switch_char[0] = PWSptr->PWSCKIN[index1++];
```

```
/*****************************************************/
/* Frame name                                        */
/*****************************************************/ index2 = 0;

while ((PWSptr->PWSCKIN[index1] != PWSPERD) &&
       (PWSptr->PWSCKIN[index1] != PWSNMTRM) &&
       (index1 <= max_name_chars))
{
  tempstr[index2++] = PWSptr->PWSCKIN[index1++];
} if ((index2 != 0) && (index2 < max_name_chars))
{
  tempstr [index2] = nullchar;
  templen = strlen(tempstr);
  frame = malloc(templen+1);
  strcpy(frame, tempstr);
  PWSptr->PWSCKILN = PWSptr->PWSCKILN - (index2 + 2);
} else
{

/*****************************************************/
/* Slot                                              */
/*****************************************************/ if (PWSptr->PWSCKIN[index1] = PWSPERD)
    index1++;

index2 = 0;

while ((PWSptr->PWSCKIN[index1] != PWSNMTRM) &&
       (index1 <= max_name_chars))
{
  tempstr[index2++] = PWSptr->PWSCKIN[++index1];
} if ((index2 != 0) && (index2 < max_name_chars))
{
  tempstr[index2] = nullchar;
  templen = strlen(tempstr);
  slot = malloc(templen+1);

PWSptr->PWSCKILN = PWSptr->PWSCKILN - (index2 + 1);
} else
   slot = NULL;

/*****************************************************/
/* Value                                             */
/*****************************************************/ index1++;
```

```
index2 = 0;

while ((PWSptr->PWSCKIN[index1] != PWSDATRM) &&
       (index1 <= max_name_chars))
{
  tempstr[index2++] = PWSptr->PWSCKIN[index1++];
} if ((index2 != 0) && (index2 < max_name_chars))
{
  tempstr[index2] = nullchar;
  templen = strlen(tempstr);
  value = malloc(templen+1);
  PWSptr->PWSCKILN = PWSptr->PWSCKILN - (index2 + 1);
} else
{
  *value = NULL;
  PWSptr->PWSCKILN--;
} index1++;

switch (switch_char[0])
{ case PWSCHG:

FCHG(PUT_NAME (frame,0),
          PUT_NAME (slot,0),
          PUT_NAME (facet,0),
          PUT_NAME (value,0),
          PUT_NAME (class,0));

/****************************************************/
/* If FCHG call fails, frame may not exist; in this  */
/* case create frame                                 */
/****************************************************/ if (rc != 0)
   FPUT(PUT_NAME (frame,0),
        PUT_NAME (slot,0),
        PUT_NAME (facet,0),
        PUT_NAME (value,0),
        PUT_NAME (class,0));

break;

case PWSDEL:

FDEL(PUT_NAME (frame,0),
        PUT_NAME (slot,0),
        PUT_NAME (facet,0),
        PUT_NAME (value,0),
        PUT_NAME (class,0));
```

```
    break;
}
```

We claim:

1. A computer-implemented method for sharing common values implicitly among generative objects, the objects respectively being accessible only across counterpart logically partitioned and isolated demand/response interfaces, at least one of the partitions including a cyclic, rule-based, object-sensitive production system otherwise termed a knowledge processing environment (KPE), comprising the steps of:

(a) creating a process in each partition cooperative with counterpart concurrent processes in other partitions across the counterpart synchronous demand/response interface;

(b) processes in each partition selectively creating, modifying, or deleting common values, and forming a list of changes;

(c) processes in other than the KPE partition communicating any change list to the KPE partition independent from and concurrently with any procedural request to the KPE partition;

(d) causing the KPE partition to update its common values according to the change list; and (e) altering any change list originating at the KPE partition into a format readily usable by a process in a non-KPE partition and communicating said formatted change list to said non-KPE partition.

2. The method according to claim 1, wherein the object in the KPE partition includes a frame, each frame having a frame name, slot, facet, and value portion thereof;

wherein said production system in the KPE partition further includes a frame manager for creating and manipulating frames among objects;

wherein the common values are included in only those frames which constitute a common subset of all of the frames; and wherein the common values in non-KPE partitions are formatted as records.

3. The method according to claim 1, wherein a first application overlaying and executing on the KPE partition and a second application overlaying and executing on a non-KPE partition, each application selectively invoking said cooperative concurrent processes and perfecting synchronism of common values declaratively rather than explicitly.

4. A computer-implemented method for sharing common values implicitly between a pair of communicating generative objects, both objects residing in a cyclic, rule-based, object-sensitive production system, each object including rules and data structures, each rule having a pattern indication part and an action specifying part, at least one rule having an action part changing the data state of the object, any rule executed during a current cycle being selected from the set of rules defined by a match between changed data and the pattern part of said rules, said changed data being limited to that occurring during a preceding cycle, said rules also including "if-needed" procedures termed "demons" which execute whenever a predetermined pattern or event occurs independent of any context or goal concurrently being executed by said production system, comprising the steps of:

(a) at a first object when executing, creating, altering, or deleting at least one common value, forming a list of such changes, and communicating said change list to a second object independent of and concurrently with any procedural request;

(b) at the second object when executing and responsive to the change list, updating its common values; and (c) terminating the communicating relationship between said objects by either object self-extinguishing when executing.

5. The method according to claim 4, wherein each object is organized as a frame, each frame having a frame name, slot, facet, and value portion thereof;

wherein said system further includes a frame manager for creating and manipulating frames among objects; and wherein the common values are included in only those frames which constitute a common subset of all of the frames.

6. The method according to claim 5, wherein selected frame facets are correlated with selected demons.

7. A computer-implemented method for implicitly altering the data state of common values shared by a pair of communicating generative objects, a first object residing in a cyclic, rule-based, object-sensitive production system otherwise termed a knowledge processing environment (KPE), and a second object residing in a data processing environment (DPE), the KPE resident object including rules and data structures, said rules including "if-needed" procedures termed "demons" which execute whenever a predetermined pattern or event occurs independent of any context or goal concurrently being executed by said production system, rules other than "demons" having context-dependent pattern indication and action specifying parts thereof, said KPE including means for storing the objects, and means cooperating with the storage means for executing a control cycle, said control cycle comprising the steps of:

(i) identifying an executable subset of rules by matching the pattern parts of the rules to those objects in the storage means modified or created during a preceding cycle, (ii) selecting a rule from the identified rules, and (iii) executing the action prescribed by the selected rule;

said method comprising the steps of:

(a) in the event that said DPE object when executing creates, modifies, or deletes at least one common value, forming a list of such changes, and communicating said change list from the DPE object to the KPE object;

(b) at the KPE object when executing and responsive to the DPE change list, altering the KPE data state by updating of the KPE common values;

(c) in the event that said KPE object when executing creates, modifies, or deletes at least one common value, causing the formation of another list of such changes, and communicating said other list from the KPE object to the DPE object in a readily usable format;

(d) at the DPE object when executing and responsive to the KPE change list, altering the DPE data state by updating the DPE common values; and (e) terminating the communicating relationship between said objects by either object self-extinguishing when executing.

8. The method according to claim 7, wherein step (c) includes the step of invoking demons to effectuate altering the KPE data state of common values and creating the change list.

9. The method according to claim 7, wherein the KPE being operable within a host-based stored program-controlled computer and the DPE being operable with a terminal remote from said host but communicatively attached thereto.

10. The method according to claim 7, wherein each object in the KPE storage means is organized as a frame, each frame having a frame name, slot, facet, and value portion thereof;

wherein said system further includes a frame manager for creating and manipulating frames in said storage means; and wherein the common values are included in only those frames which constitute a common subset of all of the frames stored in the KBS storage means.

11. The method according to claim 10, wherein selected frame facets are correlated with selected demons.

12. The method according to claims 1, 4, or 7, wherein the list is prefixed to each procedural request, and wherein the list contents are not necessarily correlated with the procedural request.

* * * * *